Dec. 31, 1929.  W. MERTÉ  1,741,947
PHOTOGRAPHIC LENS, CORRECTED SPHERICALLY, CHROMATICALLY,
ASTIGMATICALLY, AND FOR COMA
Filed June 11, 1927
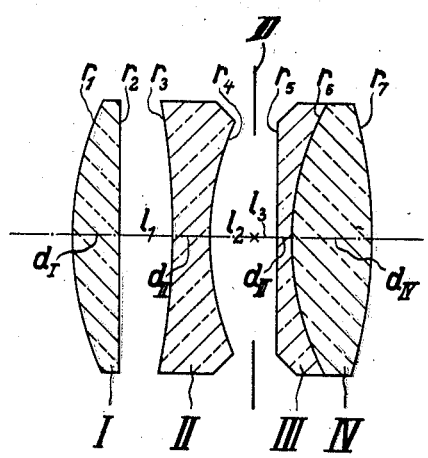
$r_1 = +\ 32.08$　　$d_I = 4.63$
$r_2 = \pm\ \infty$　　$l_1 = 5.42$
$r_3 = -\ 71.13$　　$d_{II} = 3.73$
$r_4 = +\ 28.85$　　$l_2 = 4.42$
$r_5 = \pm\ \infty$　　$l_3 = 2.29$
$r_6 = +\ 28.50$　　$d_{III} = 1.50$
$r_7 = -\ 47.22$　　$d_{IV} = 8.00$
　　I　　　　　　II
$n_D$ = 1.6071７　　1.57596
$\nu$ =  59.5　　　41.3
　　III　　　　　IV
$n_D$ = 1.52648　　1.62377
$\nu$ =  51　　　　56.9
Inventor:
Willy Merté

Patented Dec. 31, 1929

1,741,947

UNITED STATES PATENT OFFICE

WILLY MERTÉ, OF JENA, GERMANY, ASSIGNOR TO THE FIRM CARL ZEISS, OF JENA, GERMANY

PHOTOGRAPHIC LENS, CORRECTED SPHERICALLY, CHROMATICALLY, ASTIGMATICALLY, AND FOR COMA

Application filed June 11, 1927, Serial No. 198,213, and in Germany June 26, 1926.

The present invention relates to lenses for photographic and projection work, which are corrected spherically, chromatically, astigmatically and for coma and which consist of three lenses separated by air-space, viz, a biconcave lens and two collective lenses embracing the same. With these lenses the one of the two collective lenses is a single lens, while the other is composed of two members of opposite refractive power with a collective cemented surface, wherein according to the absolute values the radius of curvature of the cemented surface is at the most equal to five-sixths of the radius of curvature of the uncemented surface of the collective member of the composite collective lens and at the most equal to half the focal length of the photographic lens and, wherein, in addition, the radius of curvature of the outer surface of the collective single lens is at least equal to one third of the absolute value of the radius of curvature of the outer surface of the composite collective lens but at the most equal to the absolute value of this radius of curvature itself.

According to the present invention with a photographic lens of the above type particularly favourable optical results can be attained if (a) The total of the absolute values of the radii of curvature of the two outer surfaces of the photographic lens be at least equal to three-fourths of the focal length of the photographic lens and if (b) The total of the absolute values of the radii of curvature of the biconcave lens be at least equal to nine-tenths of the focal length of the photographic lens and thereby the absolute value of the one of the radii of curvature of the biconcave lens be chosen not greater than the three and a half fold value of the other radius of curvature of this lens.

A substantial, although not such an extensive improvement of the optical performance of the photographic lenses of the above described type may also be attained by constructing the photographic lenses in such a way that, of the conditions, mentioned above under (a) and (b) only the one under (a) is fulfilled or that only the conditions under (b) are complied with.

The accompanying drawing shows a constructional example of a photographic lens according to the invention. The said constructional example comprises a single collective lens I, a biconcave lens II, and a collective lens composed of two members, III and IV, of opposite refractive power, with a collective cemented surface. Between the last-mentioned collective lens and the lens II a diaphragm D is provided.

The subjoined tables show the data of the constructional example in which all conditions cited under (a) and (b) are fulfilled. With this photographic lens the largest aperture-ratio is 1:3.5 and the available image field amounts to fully 55°. The following figures relate to a focal length of the photographic lens of 100 units.

| Radii | Thickness and distances |
|---|---|
| $r_1 = +32.08$ | $d_1 = 4.63$ |
| $r_2 = \pm \infty$ | $l_1 = 5.42$ |
| $r_3 = -71.13$ | $d_{II} = 3.73$ |
| $r_4 = +28.85$ | $l_2 = 4.42$ |
| $r_5 = \pm \infty$ | $l_3 = 2.29$ |
| $r_6 = +28.50$ | $d_{III} = 1.50$ |
| $r_7 = -47.22$ | $d_{IV} = 8.00$ |

Kinds of glass

| | I | II | III | IV |
|---|---|---|---|---|
| $n_D =$ | 1.60717 | 1.57596 | 1.52648 | 1.62377 |
| $\nu =$ | 59.5 | 41.3 | 51.4 | 56.9 |

I claim:

1. Photographic lens, corrected spherically, chromatically, astigmatically and for coma, consisting of three lenses separated by air-space, viz, a biconcave lens and two collective lenses embracing the same, of which the one is a single lens, while the other is composed of two members of opposite refractive power with a collective cemented surface, wherein according to the absolute values the radius of curvature of the cemented surface is at the most equal to five-sixths of the radius of curvature of the uncemented surface of the collective member of the composite collective lens and at the most equal to half the focal length of the photographic lens and wherein, in addition, the radius of curvature of the outer surface of the collective single lens is at least equal to one third of the radius of curvature of the outer surface of the composite collective lens but at the most equal to this radius of curvature itself, the total of the absolute values of the radii of curvature of the two outer surfaces of the photographic lens being at least three-fourths of the focal length of the photographic lens.

2. Photographic lens, corrected spherically, chromatically, astigmatically and for coma, consisting of three lenses separated by air-space, viz, a biconcave lens and two collective lenses embracing the same, of which the one is a single lens, while the other is composed of two members of opposite refractive power with a collective cemented surface, wherein according to the absolute values the radius of curvature of the cemented surface is at the most equal to five-sixths of the radius of curvature of the uncemented surface of the collective member of the composite collective lens and at the most equal to half the focal length of the photographic lens and wherein, in addition, the radius of curvature of the outer surface of the collective single lens is at least equal to one third of the radius of curvature of the outer surface of the composite collective lens but at the most equal to this radius of curvature itself, the total of the absolute values of the radii of curvature of the biconcave lens being at least nine-tenths of the focal length of the photographic lens and thereby one of the radii of curvature of the biconcave lens being according to its absolute value not larger than the three and a half fold of the other radius of curvature of this lens.

3. Photographic lens, corrected spherically, chromatically, astigmatically and for coma, consisting of three lenses separated by air-space, viz, a biconcave lens and two collective lenses embracing the same, of which the one is a single lens, while the other is composed of two members of opposite refractive power with a collective cemented surface, wherein according to the absolute values the radius of curvature of the cemented surface is at the most equal to five-sixths of the radius of curvature of the uncemented surface of the collective member of the composite collective lens and at the most equal to half the focal length of the photographic lens and wherein, in addition, the radius of curvature of the outer surface of the collective single lens is at least equal to one third of the radius of curvature of the outer surface of the composite collective lens but at the most equal to this radius of curvature itself, the total of the absolute values of the radii of curvature of the two outer surfaces of the photographic lens being at least three-fourths of the focal length of the photographic lens and the total of the absolute values of the radii of curvature of the biconcave lens being at least nine-tenths of the focal length of the photographic lens and thereby one of the radii of curvature of the biconcave lens being according to its absolute value not larger than the three and a half fold of the other radius of curvature of this lens.

WILLY MERTÉ.